(12) United States Patent
Bell

(10) Patent No.: US 10,787,112 B2
(45) Date of Patent: Sep. 29, 2020

(54) VEHICLE LIGHT FIXTURE FOR CONNECTING A CAMERA

(71) Applicant: Furrion Property Holding Limited, Hong Kong (HK)

(72) Inventor: Steven Neill Bell, Hong Kong (HK)

(73) Assignee: Furrion Property Holding Limited, Hong Kong (HK)

( * ) Notice: Subject to any disclaimer, the term of this patent is extended or adjusted under 35 U.S.C. 154(b) by 69 days.

(21) Appl. No.: 15/976,124

(22) Filed: May 10, 2018

(65) Prior Publication Data

US 2018/0334081 A1    Nov. 22, 2018

(51) Int. Cl.
| | | |
|---|---|---|
| *B60Q 1/00* | (2006.01) | |
| *H04N 7/18* | (2006.01) | |
| *B60R 11/04* | (2006.01) | |
| *B60Q 1/30* | (2006.01) | |
| *B60R 11/00* | (2006.01) | |

(52) U.S. Cl.
CPC ............ *B60Q 1/0023* (2013.01); *B60R 11/04* (2013.01); *H04N 7/183* (2013.01); *B60Q 1/30* (2013.01); *B60Q 2900/10* (2013.01); *B60R 2011/004* (2013.01)

(58) Field of Classification Search
None
See application file for complete search history.

(56) References Cited

U.S. PATENT DOCUMENTS

| | | | | |
|---|---|---|---|---|
| 6,959,994 | B2* | 11/2005 | Fujikawa | B60R 1/00 |
| | | | | 348/148 |
| 8,599,259 | B2* | 12/2013 | Sato | B60R 1/00 |
| | | | | 348/148 |
| 8,636,393 | B2* | 1/2014 | Schofield | B60Q 1/1423 |
| | | | | 362/466 |
| 9,090,213 | B2* | 7/2015 | Lawlor | B60R 1/12 |
| 2005/0046696 | A1 | 3/2005 | Lang et al. | |
| 2005/0200494 | A1* | 9/2005 | Herrmann | G08B 13/19619 |
| | | | | 340/693.5 |
| 2006/0262545 | A1* | 11/2006 | Piepgras | F21K 9/00 |
| | | | | 362/373 |
| 2007/0237517 | A1* | 10/2007 | Park | G03B 17/00 |
| | | | | 396/427 |
| 2010/0265328 | A1* | 10/2010 | Chou | B60R 11/04 |
| | | | | 348/143 |

* cited by examiner

*Primary Examiner* — Elmito Breval
(74) *Attorney, Agent, or Firm* — Faegre Drinker Biddle & Reath LLP

(57) ABSTRACT

A light fixture for a vehicle includes a light housing for installation on the vehicle that has one part of a two-part mechanical coupling. A power input connects a lamp and electrical coupling in the light housing to a power source. A dummy fitting, with the other part of the two-part mechanical coupling, is mechanically connected by the other part to the light housing so as to be removeable from the light housing to expose the electrical coupling for the retrofitting of a camera that also has the other part of the two-part mechanical coupling and a complementary connector for engaging the electrical coupling. Also disclosed is a camera for retrofitting to the light fixture after removal of the dummy fitting.

17 Claims, 4 Drawing Sheets

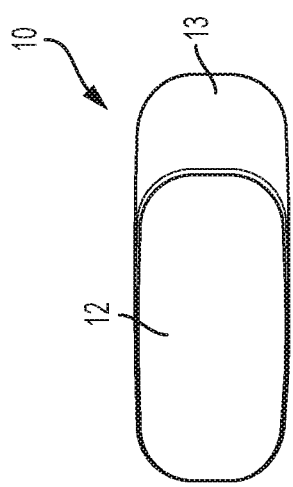
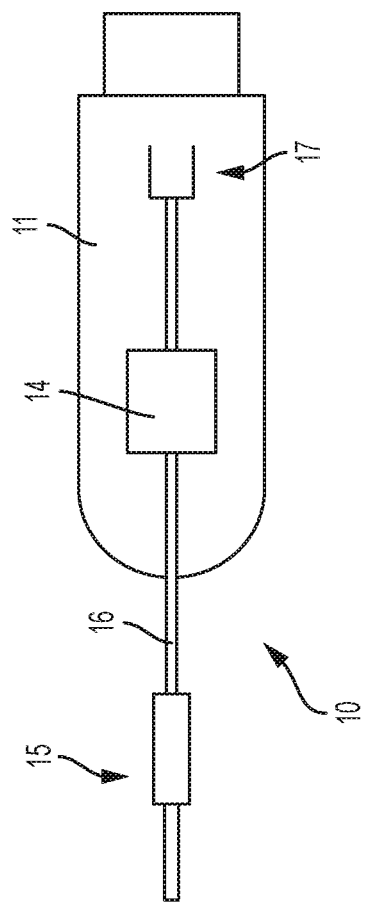
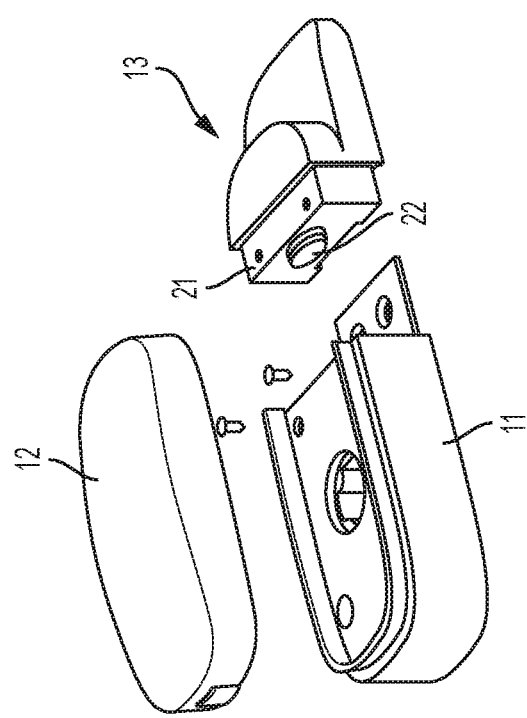

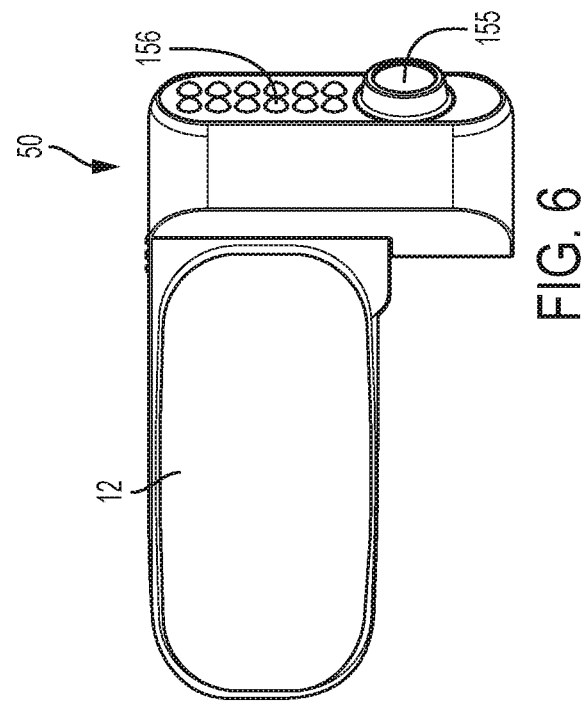
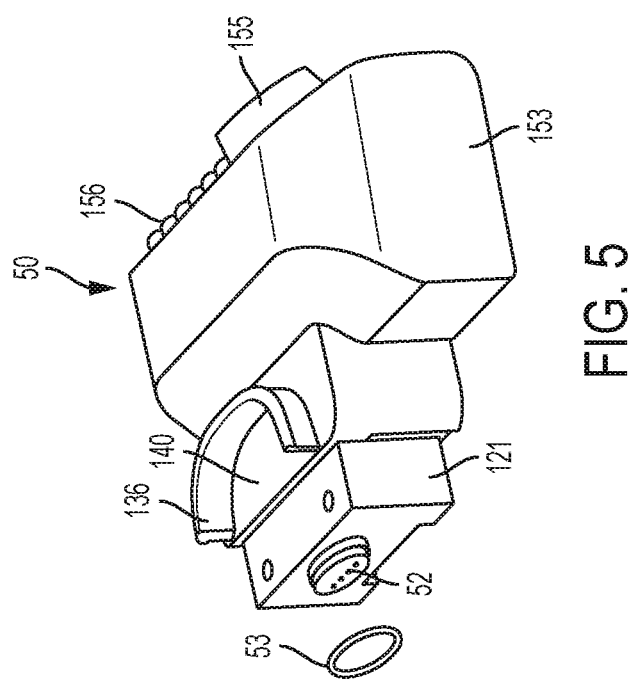

VEHICLE LIGHT FIXTURE FOR CONNECTING A CAMERA

CROSS REFERENCE TO RELATED APPLICATION

The present application claims the benefit of and priority to Australia Patent Application No. 2017901838, filed May 17, 2017, entitled VEHICLE LIGHT FIXTURE FOR CONNECTING A CAMERA, which is hereby incorporated by reference in its entirety for all that it teaches and for all purposes.

TECHNICAL FIELD

The present invention relates generally to a light fixture for a vehicle, such as a tail light and, more particularly, to such a light fixture that is adapted for mechanically and electrically connecting a camera, especially for retrofitting the camera to the vehicle.

BACKGROUND OF THE INVENTION

Systems utilizing remote cameras and displays have recently been incorporated in vehicles to aid drivers in identifying hazards in the areas immediately behind and around the vehicle. Some vehicles provide, usually on an optional basis, integrated camera systems, but they tend only to offer these on their costlier models. Many consumers do not opt for the option because of a relatively high cost, so the majority of vehicles sold have neither cameras, nor provision for their fitment.

Because of the desirability of this driver's aid, it would be advantageous to make provision in the vehicle for the retrofit of a camera system, such as might occur in the after-market or at a dealership. While wireless cameras mitigate the need to run several groups of wires to transmit image data, the need remains to provide power cabling to connect the remote cameras. In addition, retrofitting these systems involves disassembly to gain access, and drilling holes from the exterior to the interior of the vehicle for wires and mounting brackets, and these holes are vulnerable to not being properly sealed. This retrofit procedure is thus time-consuming, it risks damage to the vehicle and permanently defaces the vehicle, making the subsequent removal of a retrofitted camera similarly problematic.

A known light/camera fixture such as described in U.S. 20050046696, has a circuit for connecting the vehicle light housing to a power source for providing power to the lamp and camera and might be used (simply without the camera) to allow later fitment of the camera. However, this arrangement suffers from drawbacks in that an open, outwardly-facing recess for holding the camera may allow the ingress of contaminants and make the camera, once retrofitted, vulnerable to theft. While providing a cover with a transparent window in the camera's field of view may seal the fixture closed, it still leaves an unsightly empty recess, and also makes it difficult to adjust the field of view of the camera, as the cover must first be removed. It is an object of the present invention to overcome or substantially ameliorate the above disadvantages or, more generally, to provide an improved light fixture for connecting a camera to a vehicle.

DISCLOSURE OF THE INVENTION

According to one aspect of the present invention there is provided a light fixture for a vehicle, the light fixture including:

a light housing for installation on the vehicle;
a lamp in the light housing for providing illumination from the vehicle;
a lens for covering the lamp;
an electrical coupling in the light housing;
a power input for connecting the lamp and the electrical coupling to a power source;
one part of a two-part mechanical coupling on the light housing; and
a dummy fitting with the other part of the two-part mechanical coupling, wherein the dummy fitting is mechanically connected by the other part to the light housing so as to be removeable from the light housing to expose the electrical coupling for the retrofitting of a camera that also has the other part of the two-part mechanical coupling and a complementary connector for engaging the electrical coupling.

The invention thus provides a simple, cost-effective, modular assembly for retrofitting a camera to a vehicle without permanently defacing the vehicle.

Optionally, the power input may comprise electrical terminals, wires, a plug or socket connector, or like known means adapted for connection to the power source.

Preferably the parts of the two-part mechanical coupling comprise a projection and a recess of complementary form for receiving the projection, the projection and recess being adapted for mutual connection and disconnection by relative movement along an axis, and wherein the electrical coupling is also adapted for simultaneous connection and disconnection by movement along the axis. The invention thus provides for simultaneous mechanical and electrical connection of the camera during retrofitting.

Preferably the light housing has a rear for abutting the vehicle and an opposing front, at least part of the front being covered by the lens, and sides connecting the front and rear, and wherein the axis intersects one of the sides.

Preferably the light housing has an approximately rectangular prismatic form and the axis is aligned generally parallel to an elongate direction thereof.

The light housing may be a single component, formed as by moulding from polymeric material, or an assembly of such components.

Preferably the dummy fitting matches the size of the light housing to provide an integrated appearance. Preferably the dummy fitting is elongated parallel to the axis and has substantially the same width as the light housing, such that, adjacent the interface between the dummy fitting and the light housing, parallel faces of both the dummy fitting and the light housing, on opposing sides, are substantially coplanar.

Preferably a first rib extends around part of the perimeter of the front of the light housing, and the lens is fastened to the first rib, as by a snap fit. Preferably the first rib is U-shaped in its elongate direction, extending alongside one short side of the front of the light housing and alongside two long sides of the front of the light housing to terminate adjacent the interface, and wherein the lens encompasses the first rib.

Preferably the first rib projects from a substantially planar front face of the front of the light housing, and the dummy fitting comprises a face substantially coplanar with the front face, but without a rib.

Preferably the projection and recess are substantially rectangular in cross-section, preventing relative rotation about the axis. The projection and recess may taper in the axial direction.

Preferably a hidden fastener, such as a screw fastener, fixes the dummy fitting to the light housing. Advantageously, providing a hidden fastener provides better security against theft. The fastener may extend through one of the light housing and the dummy fitting to engage the projection. Preferably the fastener is hidden by the lens, such that the lens must be removed to access the fastener.

Preferably the electrical coupling is one of a male and a female electrical coupling, and the dummy fitting includes an integral part having the form of the other of the male and a female electrical coupling, and is engaged therewith.

In another aspect of the invention there is provided a light/camera fixture for a vehicle, the light/camera fixture including:
  a light housing for installation on the vehicle;
  a lamp in the light housing for providing illumination from the vehicle;
  a lens for covering the lamp;
  an electrical coupling in the light housing;
  a power input for connecting the lamp and the electrical coupling to a power source;
  one part of a two-part mechanical coupling on the light housing; and
  a camera with the other part of the two-part mechanical coupling and which is mechanically connected by the other part to the light housing, the camera further comprising a complementary connector for engaging the electrical coupling.

In yet another aspect of the invention there is provided a camera for retrofitting to the light fixture after removal of the dummy fitting, the camera comprising: the other part of the two-part mechanical coupling and a complementary connector for engaging the electrical coupling and supplying power for operating the camera.

Preferably the camera further comprises a camera front face substantially coplanar with the front face of the light housing, a second rib projecting from the camera front face, and cooperating with the first rib to extend adjacent the perimeter of the lens.

Preferably the camera comprises a camera body holding a camera lens wherein the other part of the two-part mechanical coupling is, optionally:
  a) formed integrally with the camera body, or
  b) connected by a moveable joint to the camera body for adjusting the field of view of the camera.

The moveable joint may comprise a hinge aligned parallel to the long axis.

Preferably the camera is adapted for the wireless transmission of image data. The camera may further comprise a light source for illuminating the field of view.

In still another aspect of the invention there is provided a vehicle having mounted thereto one or more light fixtures as described above, or one or more light/camera fixtures as described above.

In a preferred embodiment, the vehicle includes four light fixtures as described above, or four light/camera fixtures as described above, one at the front of the vehicle, one on each side of the vehicle and one at the rear.

BRIEF DESCRIPTION OF THE DRAWINGS

Preferred forms of the present invention will now be described by way of example with reference to the accompanying drawings, wherein:

FIG. 2 is an exploded view of the same components FIG. 1 but from a different viewing angle;

FIG. 3 is a front view of the components of FIG. 1 assembled together;

FIG. 4 is a schematic of the electrical components of the light fixture of FIG. 3;

FIG. 5 is perspective view of a first camera for connection to the light fixture of FIG. 1;

FIG. 6 is a front view of the first camera of FIG. 5 mounted to the light housing of FIG. 1;

DESCRIPTION OF THE PREFERRED EMBODIMENTS

Figure 1:
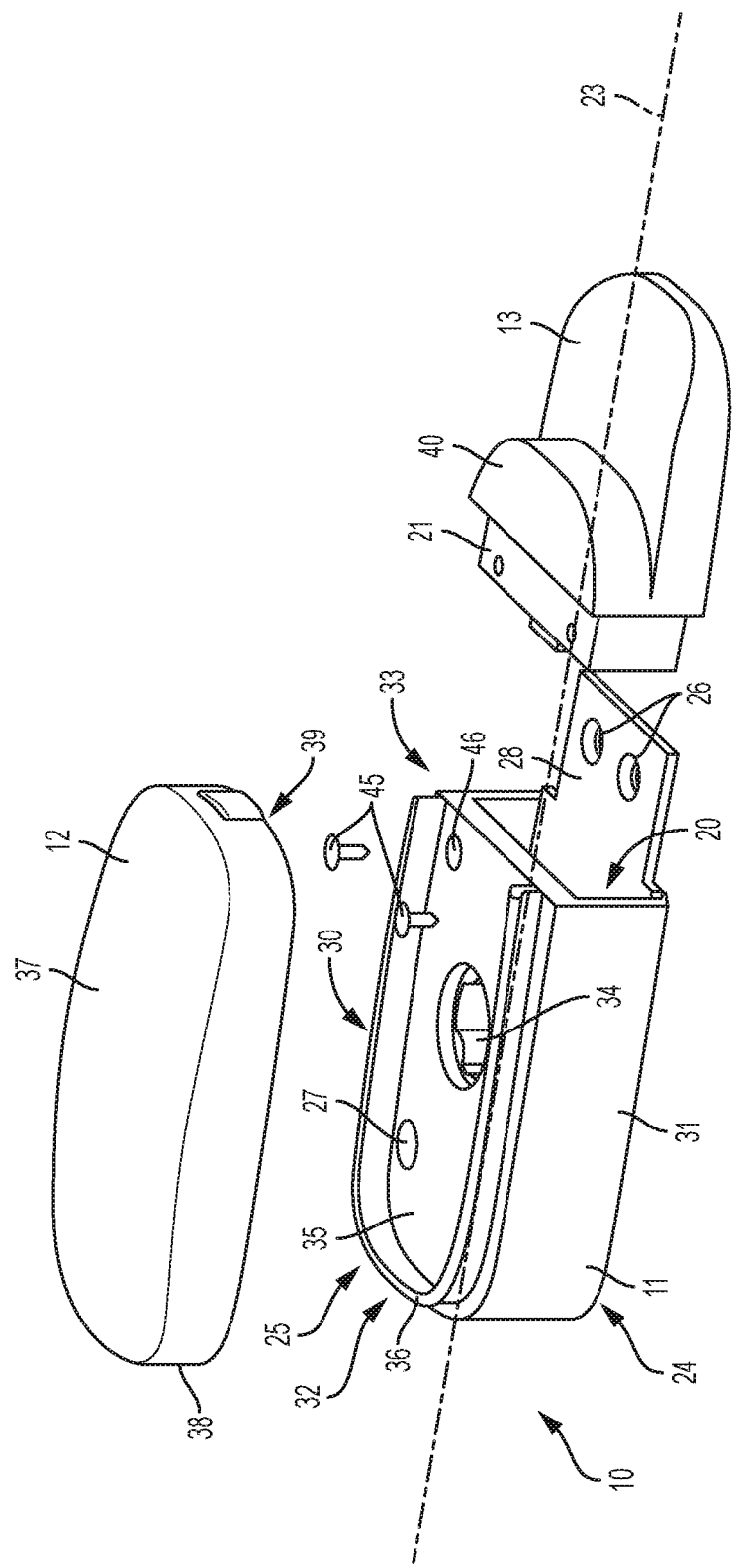
FIG. 1 is an exploded view of some of the components of a light fixture according to an embodiment of the invention.
Figure 8:
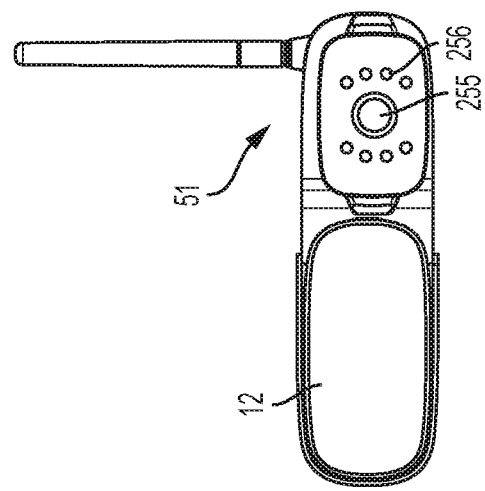
FIG. 8 is a front view of the components of FIG. 7 assembled together.
Figure 7:
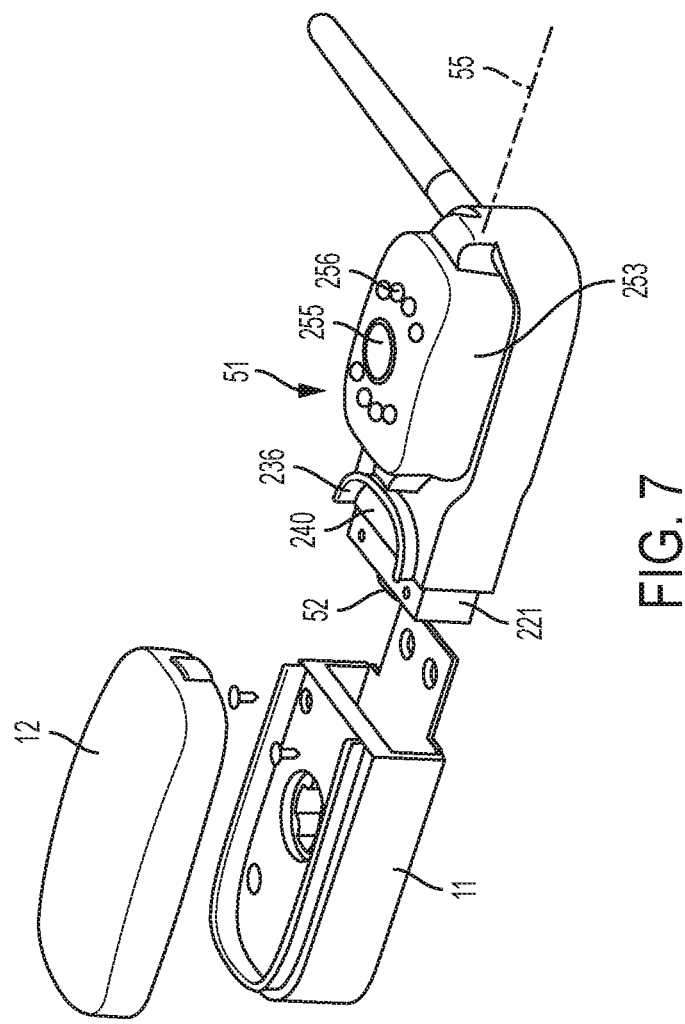
FIG. 7 is an exploded view of an assembly including the light housing of FIG. 1 and a second camera.

Referring to FIGS. 1 to 3, a light fixture 10 for a vehicle (not shown) generally includes a light housing 11, a lens 12 and a dummy fitting 13. Mounted in the light housing 11 beneath the lens 12 is a lamp 14. A power input may be in the form of plug 15 on the end of a wire 16 for connecting the lamp 14 and an electrical coupling 17 to a power source (not shown).

A recess part 20 may disposed on the light housing 11, and a projection part 21 on the dummy fitting 13, the recess part 20 and projection part 21 being elements of two-part mechanical coupling, whereby the projection part 21 is received in the recess part 20 for coupling the light housing 11 and dummy fitting 13 together. The recess part 20 and projection part 21 may be substantially rectangular in cross-section, preventing relative rotation about the axis 23 and, optionally they may taper in the axial direction for an interference fit.

The electrical coupling 17 may be disposed inside the recess part 20 and may be a female electrical coupling. The projection part 21 may further comprise a male part 22 that may be integral therewith. The male part 22 is complementary to the female electrical coupling 17 (for instance, both may be circular in cross section), but lacks any electrical element, as does the entire dummy fitting 13. The electrical coupling 17 is thus directly closed by the male part 22, whereas the projection part 21 closes the recess part 20, by relative movement between the light housing 11 and dummy fitting 13 along the axis 23. The dummy fitting 13 is thus removeable from the light housing 11 to expose the electrical coupling 17 for the retrofitting of a camera that also has the other part of the two-part mechanical coupling and a complementary connector for engaging the electrical coupling 17.

The light housing 11 may be of approximately rectangular prismatic, hollow form with a projecting flange 28. A generally planar, rectangular rear 24 may be provided for abutting the vehicle, or a gasket (not shown) for sealing between the housing 11 and the vehicle. Fasteners (not shown) may extend through openings 26, 27 in the light housing 11 for securing the light housing 11 to the vehicle. An opposing front 25 of light housing 11 is largely covered by the lens 12. The front and rear 24, 25 are connected by sides opposing long sides 30, 31 on opposite sides of the longitudinal axis 23, and by short sides 32, 33 which are both intersected by the axis 23.

The front 25 may have a substantially planar front face 35 from which an elongate first rib 36 projects, the first rib 36 extending adjacent part of the perimeter of the front 25. The first rib 36 may be U-shaped in its elongate direction, extending alongside short side 32 and alongside the two long sides 30, 31 of the front to terminate adjacent the interface at the short side 33. A recess 35 in the front 25 may receive the lamp 14.

The lens 12 may be formed of translucent polymeric material, with a convex outer surface 37 integral with a peripheral flange 38 that terminates in a planar edge 39 for abutting the front face 35. Resilient deflection of the rib 36 (and/or lens 12) may allow the lens 12 to be pressed over the rib 36, to encompass the first rib 36, and thereby fasten the lens to the first rib 36 by a snap fit.

The dummy fitting 13 may comprise a face 40 substantially coplanar with the front face 35, but without a rib, and with a like convex for as the opposing short side 32. The dummy fitting 13 may be elongated parallel to the axis 23 and have substantially the same width as the light housing 11. Adjacent the interface at short side 33, between the dummy fitting 13 and the light housing 11, parallel faces of both the dummy fitting and the light housing, on opposing sides, are substantially coplanar. The dummy fitting 13 thus matches the size of the light housing 11 in the transverse direction to provide an integrated appearance.

Hidden screw fasteners 45 may be hidden by the lens 12 and serve to fix the dummy fitting 13 to the light housing 11, such that the lens 12 must be removed to access the fasteners 45, for security against theft. The fasteners 45 may be disposed in openings 46 in the front face 35 and extend through the light housing to engage the projection 21.

Referring to FIGS. 5 to 8, there are shown two cameras 50, 51 which may be retrofitted to the light fixture 10 by replacing the dummy fitting 13 with one of the cameras 50, 51.

As best seen in FIG. 5, both cameras 50, 51 include both a respective projection part 121, 221 of like form to the projection part 21 for mechanically coupling the cameras 50, 51 to the light fixture 10 and a complementary male electrical connector 52 for engaging the female electrical coupling 17. The male electrical connector 52 likewise also extends from the projection part 121, 221, and may have a circular cross section. An o-ring 53 around the connector 52 may assist sealing.

The cameras 50, 51 may further comprise a camera front face 140, 240 substantially coplanar with the front face 35 of the light housing, and a second rib 136, 236 projecting from the camera front face 140, 240, and cooperating with the first rib 36 to extend adjacent the perimeter of the lens 12.

The cameras 50, 51 are wireless cameras adapted for the wireless transmission of image data, and each camera 50, 51 may further comprise a camera body holding a respective camera lens 155, 255 and respective light source 156, 256 for illuminating the field of view. In the camera 50 the projection part 121 is formed integrally with the camera body 153, whereas in the camera 51 the projection part 121 is connected by a hinge joint to the camera body 253 for adjusting the field of view of the camera by rotation about camera axis 55.

Aspects of the present invention have been described by way of example only and it should be appreciated that modifications and additions may be made thereto without departing from the scope thereof.

What is claimed is:

1. A light fixture for a vehicle, the light fixture including:
a light housing for installation on the vehicle;
a lamp in the light housing for providing illumination from the vehicle;
a lens for covering the lamp;
an electrical coupling in the light housing;
a power input for connecting the lamp and the electrical coupling to a power source;
one part of a two-part mechanical coupling on the light housing; and
a dummy fitting with the other part of the two-part mechanical coupling, wherein the dummy fitting is mechanically connected by the other part to the light housing so as to be removeable from the light housing to expose the electrical coupling for the retrofitting of a camera that also has the other part of the two-part mechanical coupling and a complementary connector for engaging the electrical coupling.

2. The light fixture of claim 1 wherein the parts of the two-part mechanical coupling comprise a projection and a recess of complementary form for receiving the projection, the projection and recess being adapted for mutual connection and disconnection by relative movement along an axis, and wherein the electrical coupling is also adapted for simultaneous connection and disconnection by movement along the axis.

3. The light fixture of claim 2 wherein the light housing has a rear for abutting the vehicle and an opposing front, at least part of the front being covered by the lens, and sides connecting the front and rear, and wherein the axis intersects one of the sides.

4. The light fixture of claim 2 wherein the light housing has an approximately rectangular prismatic form and the axis is aligned generally parallel to an elongate direction thereof.

5. The light fixture of claim 1 wherein the dummy fitting is elongated parallel to the axis and has substantially the same width as the light housing, such that, adjacent the interface between the dummy fitting and the light housing, parallel faces of both the dummy fitting and the light housing, on opposing sides, are substantially coplanar.

6. The light fixture claim 1 wherein a first rib extends around part of the perimeter of the front of the light housing, and the lens is fastened to the first rib.

7. The light fixture of claim 6 wherein the first rib is U-shaped in its elongate direction, extending alongside one short side of the front of the light housing and alongside two long sides of the front of the light housing to terminate adjacent the interface, and wherein the lens encompasses the first rib.

8. The light fixture of claim 6 wherein the first rib projects from a substantially planar front face of the front of the light housing, and the dummy fitting comprises a face substantially coplanar with the front face, but without a rib.

9. The light fixture of claim 1 wherein a hidden fastener fixes the dummy fitting to the light housing.

10. The light fixture of claim 1 wherein the electrical coupling is one of a male and a female electrical coupling, and the dummy fitting includes an integral part having the form of the other of the male and a female electrical coupling, and is engaged therewith.

11. A light/camera fixture for a vehicle, the light/camera fixture including:
a light housing for installation on the vehicle;
a lamp in the light housing for providing illumination from the vehicle;
a lens for covering the lamp;
an electrical coupling in the light housing;
a power input for connecting the lamp and the electrical coupling to a power source;
one part of a two-part mechanical coupling on the light housing; and a camera with the other part of the two-part mechanical coupling and which is mechanically connected by the other part to the light housing, the camera further comprising a complementary connector for engaging the electrical coupling, and the camera connecting to the light housing aside the lens.

12. A camera for retrofitting to a light fixture after removal of a dummy fitting from the light fixture, the light fixture comprising a light housing, an electrical coupling in the light housing, and one part of a two-part mechanical coupling on the light housing, the camera comprising:

the other part of the two-part mechanical coupling, the other part of the two-part mechanical coupling being configured to couple with the one part of the two-part mechanical coupling; and a complementary connector configured to engage and electrically couple to the electrical coupling upon connecting the camera to the light housing and supply power for operating the camera.

13. The camera of claim 12 further comprising a camera front face substantially coplanar with the front face of the light housing, a second rib projecting from the camera front face, and cooperating with a first rib of the light fixture to extend adjacent a perimeter of a lens of the light fixture.

14. The camera of claim 12 further comprising a camera body holding a camera lens wherein the other part of the two-part mechanical coupling is:

formed integrally with the camera body, or connected by a moveable joint to the camera body for adjusting the field of view of the camera.

15. The camera of claim 14 wherein the moveable joint comprises a hinge aligned parallel to a long axis of the camera.

16. The camera of claim 12 wherein the camera is adapted for the wireless transmission of image data.

17. The camera of claim 12 further comprising a light source for illuminating the field of view.

* * * * *

UNITED STATES PATENT AND TRADEMARK OFFICE
CERTIFICATE OF CORRECTION

PATENT NO. : 10,787,112 B2  
APPLICATION NO. : 15/976124  
DATED : September 29, 2020  
INVENTOR(S) : Bell Page 1 of 1

It is certified that error appears in the above-identified patent and that said Letters Patent is hereby corrected as shown below:

On the Title Page

Between items (65) and (61) insert, as item (30), the following:
-- (30) Foreign Application Priority Data
May 17, 2017 (AU).......................................... 2017901838 --

Signed and Sealed this  
Eighth Day of December, 2020

Andrei Iancu  
*Director of the United States Patent and Trademark Office*